United States Patent
Lee et al.

(10) Patent No.: US 11,535,229 B2
(45) Date of Patent: Dec. 27, 2022

(54) CONTROL DEVICE FOR VEHICLE AND CONTROL METHOD FOR VEHICLE

(71) Applicants: JATCO Ltd, Fuji (JP); NISSAN MOTOR CO., LTD., Yokohama (JP)

(72) Inventors: Jonghwan Lee, Seoul (KR); Tomoaki Honma, Isehara (JP); Satoshi Nakano, Chikusei (JP); Koutarou Tagami, Yokohama (JP); Yusuke Ushikubo, Sagamihara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/312,553

(22) PCT Filed: Nov. 19, 2019

(86) PCT No.: PCT/JP2019/045264
§ 371 (c)(1),
(2) Date: Jun. 10, 2021

(87) PCT Pub. No.: WO2020/121751
PCT Pub. Date: Jun. 18, 2020

(65) Prior Publication Data
US 2022/0055601 A1    Feb. 24, 2022

(30) Foreign Application Priority Data
Dec. 14, 2018   (JP) .............................. JP2018-234833

(51) Int. Cl.
*F16H 59/18*      (2006.01)
*B60W 10/101*    (2012.01)
*B60W 30/19*     (2012.01)
*F16H 61/16*      (2006.01)
*F16H 61/66*      (2006.01)

(52) U.S. Cl.
CPC .......... *B60W 10/101* (2013.01); *B60W 30/19* (2013.01); *F16H 59/18* (2013.01); *F16H 61/16* (2013.01); *B60W 2510/10* (2013.01); *F16H 2061/6615* (2013.01); *F16H 2710/24* (2013.01)

(58) Field of Classification Search
CPC .... F16H 59/18; F16H 61/16; F16H 2061/163; F16H 2061/6615; F16H 2710/24; B60W 10/101; B60W 2540/10; B60W 2540/103; B60W 2710/1005
USPC .......................................................... 701/60
See application file for complete search history.

(56) References Cited

U.S. PATENT DOCUMENTS 5,823,052 A * 10/1998 Nobumoto .......... F16H 61/6648
                                                                74/335
2016/0201798 A1    7/2016 Kikkawa et al.
2017/0130833 A1 *  5/2017 Kikkawa ................. F16H 59/44
(Continued)

FOREIGN PATENT DOCUMENTS

WO    WO-2015/046353 A1    4/2015

*Primary Examiner* — Roger L Pang
(74) *Attorney, Agent, or Firm* — Foley & Lardner LLP

(57) ABSTRACT

A controller includes a control unit configured to perform stepwise shift that upshifts a CVT in a stepped manner to accelerate a vehicle. The control unit performs a downshift control configured to downshift the continuously variable transmission in a case in which an accelerator pedal is continuously stepped on from before prohibition of the stepwise shift to after prohibition of the stepwise shift.

7 Claims, 4 Drawing Sheets

(56) References Cited

U.S. PATENT DOCUMENTS

2020/0158236 A1* 5/2020 Komuro ................. F16H 59/40
2021/0025492 A1* 1/2021 Okahara ............... F16H 59/044

* cited by examiner

CONTROL DEVICE FOR VEHICLE AND CONTROL METHOD FOR VEHICLE

TECHNICAL FIELD

The present invention relates to a control device for a vehicle and a control method for a vehicle.

BACKGROUND ART

WO2015/046353A1 discloses, as a control method for a continuously variable transmission, a control that can steplessly upshift output rotation of a drive source, the control device changing the continuously variable transmission stepwise (in a stepped manner) among a plurality of shift speeds set in advance.

SUMMARY OF INVENTION

The control is performed when a driver steps on an accelerator pedal to accelerate, and upshifts in a stepped manner (hereinafter, the upshift in the stepped manner is also called "stepwise shift"). Therefore, driving force (torque) transmitted to drive wheels decreases in a stepped manner as the vehicle speed increases.

Accordingly, in a case in which there is a factor that a traveling resistance of the vehicle increases such as that a large load is on the drive wheels (for example, an uphill of a large road grade), the vehicle may lose speed at a moment the driving force (torque) decreases in a stepped manner during a sequence of the stepwise shift, thus slowing down in an accelerating feel.

To address such situation, the stepwise upshift may be prohibited in a case in which the driving force is insufficient. However, the acceleration request of the driver may not be addressed just by simply prohibiting the stepwise upshift.

The present invention is accomplished in view of such technical problem, and an object thereof is to address the acceleration request of a driver while performing stepwise shift even when becoming in a situation in which the stepwise shift is prohibited.

According to one aspect of the present invention, a vehicle control device configured to control a vehicle having a continuously variable transmission, the control device including: a control unit configured to perform stepwise shift that upshifts the continuously variable transmission in a stepped manner to accelerate the vehicle, wherein the control unit performs a downshift control configured to downshift the continuously variable transmission in a case in which an accelerator pedal is continuously stepped on from before prohibition of the stepwise shift to after prohibition of the stepwise shift.

According to another aspect of the present invention, a control method of a vehicle to control a vehicle having a continuously variable transmission, the method including: performing stepwise shift configured to upshift the continuously variable transmission in a stepped manner to accelerate the vehicle; and performing a downshift control configured to downshift the continuously variable transmission in a case in which an accelerator pedal is continuously stepped on from before prohibition of the stepwise shift to after prohibition of the stepwise shift.

According to these aspects, it is possible to address the acceleration request of the driver while performing the stepwise shift even when becoming in the situation in which the stepwise shift is prohibited.

DESCRIPTION OF EMBODIMENTS

An embodiment of the present invention will be described below with reference to accompanying drawings.

Figure 1:
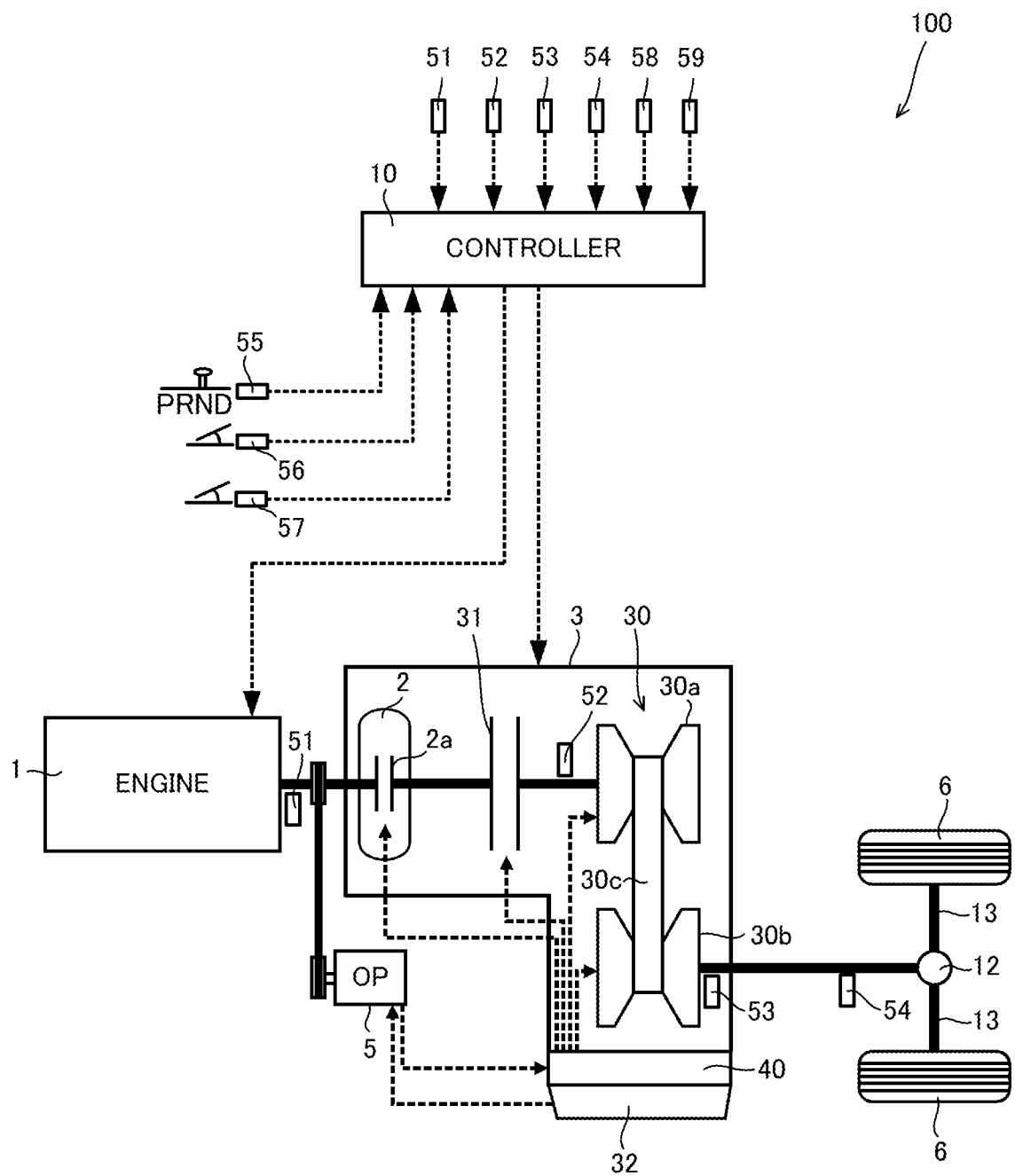
FIG. 1 is a schematic diagram of a vehicle according to an embodiment of the present invention.

FIG. 1 is a schematic diagram of a vehicle 100. The vehicle 100 includes an engine 1, an automatic transmission 3 as a continuously variable transmission, an oil pump 5, drive wheels 6, and a controller 10 as a control device.

The engine 1 is an internal combustion engine using gasoline, diesel oil or the like as fuel, and functions as a drive source for traveling. The engine 1 is controlled in rotation speed, torque and the like, on the basis of commands from the controller 10.

The automatic transmission 3 includes a torque converter 2, an engaging element 31, a belt continuously variable transmission (hereinafter, also called "CVT") 30, a hydraulic control valve unit 40 (hereinafter, also simply called "valve unit 40"), and an oil pan 32 for storing oil (working oil).

The torque converter 2 is provided on a power transmission path, between the engine 1 and the drive wheels 6. The torque converter 2 transmits power via fluid. Moreover, the torque converter 2 can enhance power transmission efficiency of driving force from the engine 1 by engaging a lock-up clutch 2a.

The engaging element 31 is disposed on the power transmission path, between the torque converter 2 and the CVT 30. The engaging element 31, on the basis of a command from the controller 10, is controlled by oil being pressure controlled by the valve unit 40, with a discharging pressure of the oil pump 5 serving as an original pressure. As the engaging element 31, a normally open multiplate wet clutch is used, for example. The engaging element 31 is configured of a forward clutch and a reverse brake not illustrated.

The CVT 30 is disposed on the power transmission path, between the engaging element 31 and the drive wheels 6, and can change a speed ratio steplessly in accordance with the vehicle speed, accelerator pedal opening and the like. The CVT 30 includes a primary pulley 30a, a secondary pulley 30b, and a belt 30c wound around both pulleys 30a, 30b. The speed ratio can be changed steplessly by moving a movable pulley of the primary pulley 30a and a movable pulley of the secondary pulley 30b in an axis direction by pulley pressure, to change a pulley contact radius of the belt 30c. The pulley pressure acting on the primary pulley 30a and the pulley pressure acting on the secondary pulley 30b are pressure controlled by the valve unit 40 with the discharging pressure from the oil pump 5 serving as the original pressure.

An output shaft of the secondary pulley 30b of the CVT 30 is connected with a differential 12 via a final reduction gear mechanism not illustrated. The differential 12 is connected to the drive wheels 6 via a drive shaft 13.

The oil pump 5 is driven by the rotation of the engine 1 being transmitted via the belt. The oil pump 5 is configured of, for example, a vane pump. The oil pump 5 pumps up oil stored in the oil pan 32, and feeds the oil to the valve unit 40. The oil fed to the valve unit 40 is used in driving the pulleys 30a, 30b, driving the engaging element 31, lubricating elements of the automatic transmission 3, and the like.

The controller 10 is configured of a microcomputer including a central processing unit (CPU), a read-only memory (ROM), a random access memory (RAM), and an input-output interface (I/O interface). The controller 10 may be configured of a plurality of microcomputers. More specifically, the controller 10 may be configured of an ATCU that controls the automatic transmission 3, an SCU that controls a shift range, an ECU that controls the engine 1, and the like. It is to be noted that the control unit in the present embodiment is a virtual unit of a function to perform a stepwise transmission control (described later) of the controller 10.

The controller 10 receives signals from a first rotation speed sensor 51 that detects a rotation speed Ne of the engine 1, a second rotation speed sensor 52 that detects an output rotation speed Nout of the engaging element 31 (=rotation speed Npri of the primary pulley 30a), a third rotation speed sensor 53 that detects a rotation speed Nsec of the secondary pulley 30b, a vehicle speed sensor 54 that detects the vehicle speed V, an inhibitor switch 55 that detects a selected range (a state of a gearshift lever or gearshift switch that switches between forward, reverse, neutral and parking) of the CVT 30, an accelerator pedal opening sensor 56 that detects an accelerator pedal opening, a pedal effort sensor 57 that detects a pedal effort of a brake, an air pressure sensor 58 that detects air pressure, a grade sensor 59 that detects a road grade, and the like. The controller 10, on the basis of these signals received, controls various operations of the engine 1, the lock-up clutch 2a of the torque converter 2, and the automatic transmission 3.

Next describes a stepwise shift control by the automatic transmission 3. In the present embodiment, when accelerating, in a case in which an acceleration α is equal to or more than a predetermined value A, a shift control is performed that upshifts the automatic transmission 3 stepwise (in a stepped manner) among a plurality of shift speeds set in advance (hereinafter, the control according to the stepwise shift is called "stepwise shift control"). The following describes the stepwise shift control of the present embodiment.

Figure 2:
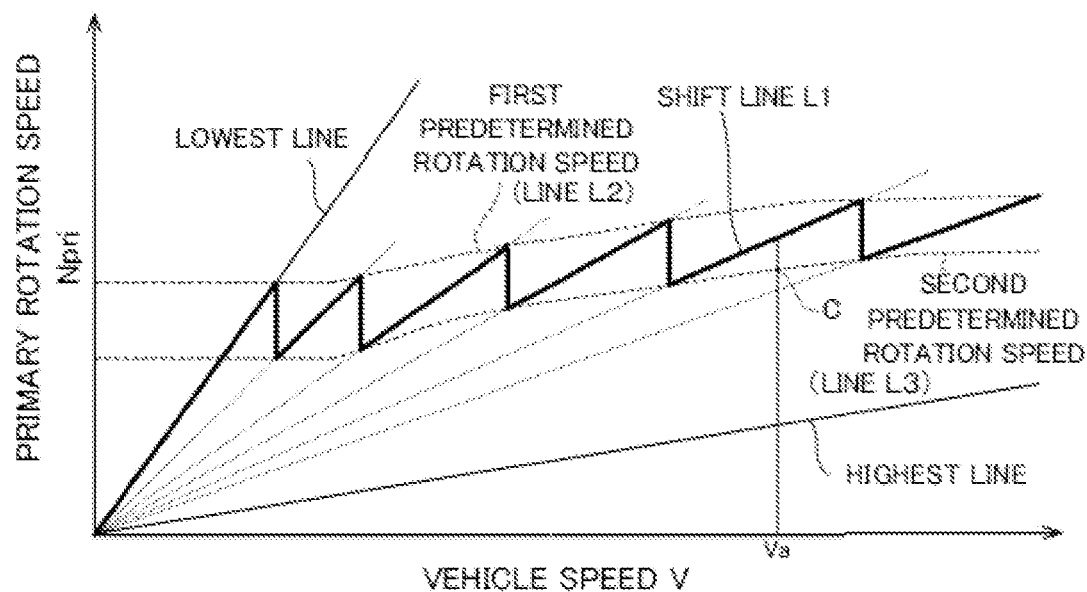
FIG. 2 is a view illustrating one example of a shift map and a shift line according to an embodiment of the present invention.

The controller 10 stores a shift map illustrated in FIG. 2 in advance. The controller 10 controls, on the basis of the shift map illustrated in FIG. 2, the CVT 30 in accordance with an engine operating state of the vehicle 100 (in the present embodiment, the vehicle speed V, the primary rotation speed Npri, the accelerator pedal opening APO). FIG. 2 illustrates just one shift line L1 at a certain accelerator pedal opening APO as one example of the stepwise shift control of the present embodiment, however practically, a plurality of shift lines set per accelerator pedal opening APO exists.

The shift map has an operating point of the automatic transmission 3 defined by the vehicle speed V and the primary rotation speed Npri. The automatic transmission 3 can shift speeds within a region between a lowest line obtained by making the speed ratio of the CVT 30 the lowest speed ratio and a highest line obtained by making the speed ratio of the CVT 30 the highest speed ratio.

The controller 10 performs a normal shift in a case in which the accelerator pedal opening APO is smaller than a stepwise shift starting opening degree according to the vehicle speed V, and performs a stepwise shift in a case in which the accelerator pedal opening APO becomes equal to or more than the stepwise shift starting opening degree according to the vehicle speed V. The stepwise shift starting opening degree is the accelerator pedal opening set in advance according to the vehicle speed V, and is set to a size at which it is determined that the driver is intending acceleration.

In the normal shift, the shift is performed on the basis of the shift line set per accelerator pedal opening APO, as with the shift map of a conventional belt continuously variable transmission.

In the stepwise shift, a shift suppression phase and an upshift phase are performed repetitively.

In the shift suppression phase, a change rate in speed ratio (changed amount in speed ratio per unit time) is zero, and the vehicle speed V increases together with an increase in the engine rotation speed (primary rotation speed Npri). In the shift suppression phase, the change rate of the speed ratio may be greater than zero. In this case, the change rate in the speed ratio is set within a range in which the primary rotation speed Npri does not decrease together with the increase in the vehicle speed V, during the shift suppression phase.

In the upshift phase, the speed ratio is changed to the higher side in a stepped manner. The change rate in the speed ratio in the upshift phase is set within a range in which the primary rotation speed Npri decreases together with the increase in the vehicle speed V.

By setting the change rates of the speed ratio in the shift suppression phase and the upshift phase as described above, the shift in the stepwise shift control becomes in a shift form repeating the increase and decrease in the primary rotation speed Npri as illustrated in FIG. 2.

In the stepwise shift control, the upshift phase is performed when the primary rotation speed Npri becomes a first predetermined rotation speed set per accelerator pedal opening APO, and once upshifted to become a second predetermined rotation speed set per accelerator pedal opening APO according to the vehicle speed V, the shift suppression phase is performed. The first predetermined rotation speed and the second predetermined rotation speed are values set in advance to become on the upshift side as the vehicle speed V increases. FIG. 2 illustrates a line connecting the first predetermined rotation speeds corresponding to the vehicle speeds V as a line L2, and illustrates a line connecting the second predetermined rotation speeds corresponding to the vehicle speeds V as a line L3.

In the shift suppression phase, the primary rotation speed Npri (engine rotation speed) gradually increases along with the increase in the vehicle speed V.

Figure 3:
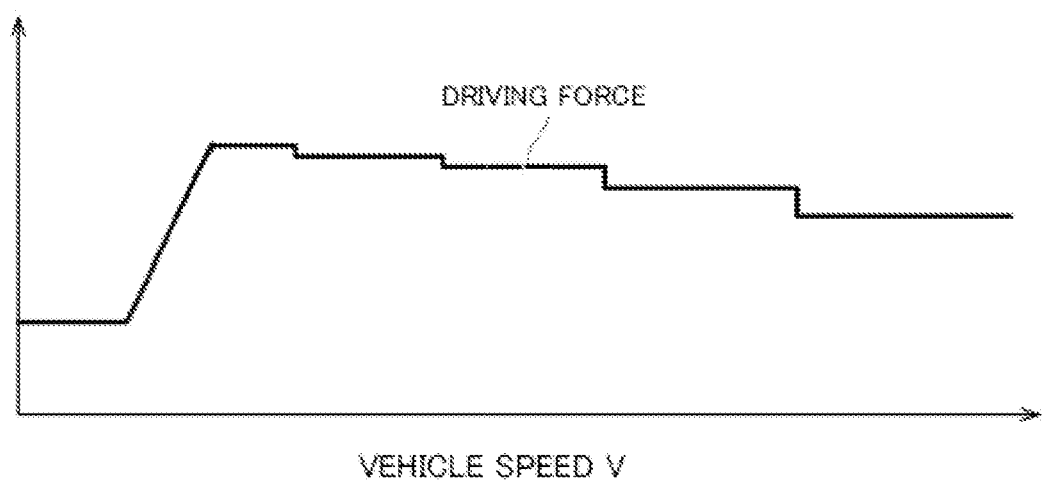
FIG. 3 is a view illustrating changes in driving force in a vehicle according to an embodiment of the present invention.

This stepwise shift control is performed, as aforementioned, when the driver steps on the accelerator pedal to accelerate the vehicle 100, and upshifts in a stepped manner. In this stepwise shift, the driving force (torque) transmitted to the drive wheels 6 decreases in a stepped manner as the vehicle speed V increases, in other words, as it upshifts as illustrated in FIG. 3.

In the case of the stepped upshift when there is a factor that the traveling resistance of the vehicle 100 increases such as a large load being applied on the drive wheels 6 (for example, approaching an uphill road with a large road grade), the driving force (torque) will rapidly decrease, and the vehicle 100 may rapidly lose speed (unintentionally be reduced in speed).

Figure 4:
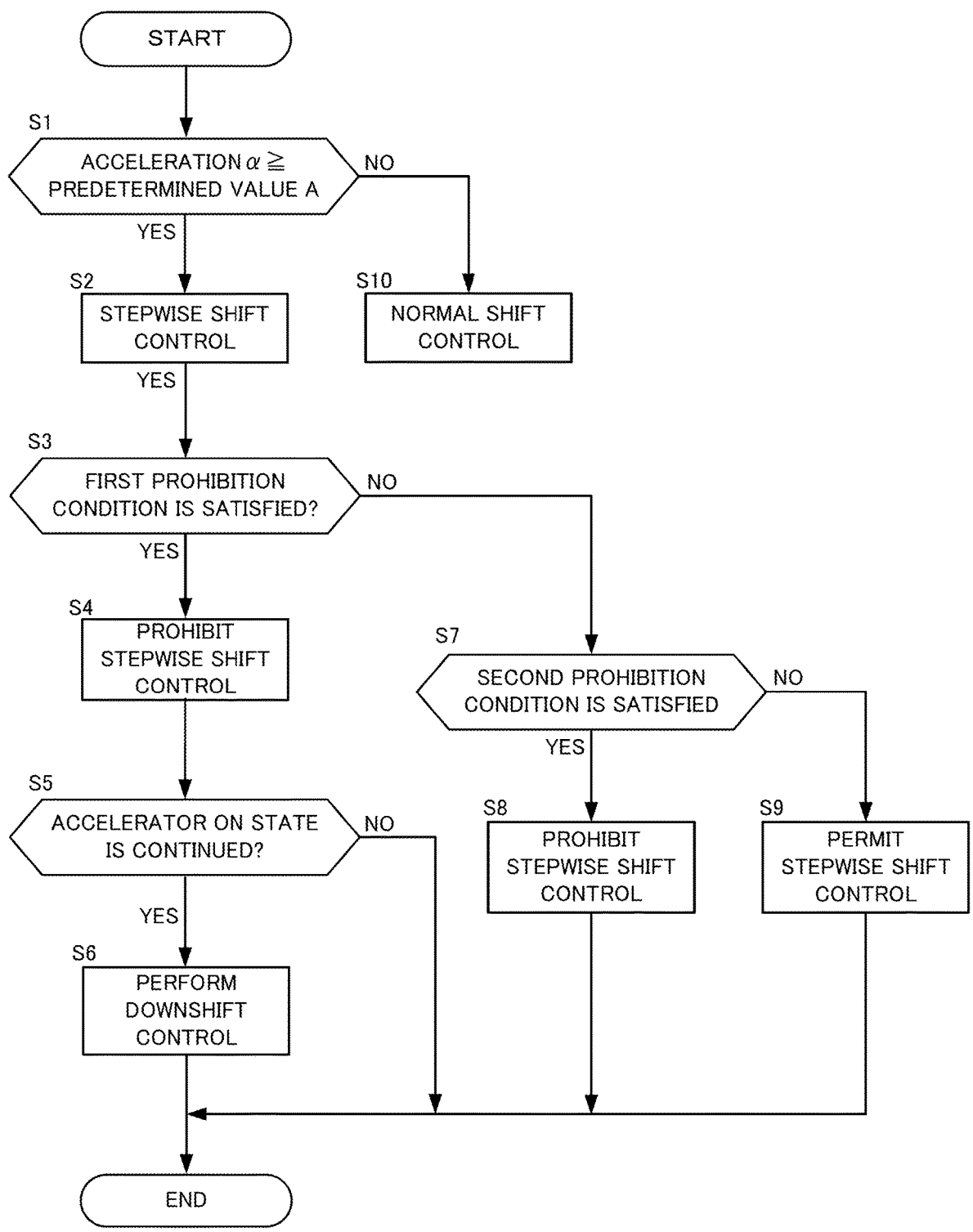
FIG. 4 is a flowchart of a shift control according to an embodiment of the present invention.

As such, in a case in which it is predicted that the vehicle 100 will lose speed due to the upshift, prohibiting the stepwise shift may be considered. However, simply just prohibiting the upshift may not address the acceleration request of the driver. On this account, in the present embodiment, in the case in which it is predicted that the vehicle 100 may lose speed due to the upshift, a downshift shift is performed to allow for addressing the acceleration request of the driver, not just simply prohibiting the upshift. The following describes in detail of the stepwise shift control of the present embodiment, with reference to the flowchart illustrated in FIG. 4. The stepwise shift control of the present embodiment is performed on the basis of a program stored in the controller 10 in advance.

First, in step S1, judgment is made whether the acceleration α is equal to or more than the predetermined value A. More specifically, the controller 10 calculates the acceleration α from the vehicle speed V detected by the vehicle speed sensor 54, to judge whether or not the acceleration α is equal to or more than the predetermined value A. If the acceleration α is judged as equal to or more than the predetermined value A, the process proceeds to step S2, and instructs the stepwise shift control. On the other hand, if the acceleration α is judged as less than the predetermined value A, the process proceeds to step S10, and performs the normal shift control.

In step S3, the controller 10 judges whether a first prohibition condition is satisfied or not.

Here, the first prohibition condition is described in detail. The first prohibition condition is a case in which a predicted driving force upon upshift is less than the predetermined value. In the present embodiment the predicted driving force upon upshift is judged whether or not it is less than the predetermined value by judging whether or not a vehicle speed change rate estimated value ΔVs is less than a threshold V1.

Here, the vehicle speed change rate estimated value ΔVs is described in detail. The vehicle speed change rate estimated value ΔVs is, more specifically, a value calculated by ΔVs=ΔV×Rn/Rp . . . (Formula 1). The following describes ΔV, Rn, Rp.

The vehicle speed change rate ΔV is a rate of change with respect to time of an output shaft rotation speed of the automatic transmission 3 during the stepwise shift. More specifically, the vehicle speed change rate ΔV is a value differentiating the rotation speed Nsec of the secondary pulley 30b detected by the third rotation speed sensor 53 by time. The rotation speed Nsec of the secondary pulley 30b is proportional to the vehicle speed V, and hence ΔV is a parameter proportional to the rate of change with respect to time of the vehicle speed V. The change with respect to time of the vehicle speed V includes all factors such as changes in vehicle weight, road grade, and traveling resistance. Therefore, ΔV is a parameter that reflects the changes in all of these factors.

An actual speed ratio Rn is a speed ratio of a current CVT 30. The actual speed ratio Rn is calculated on the basis of the rotation speed Npri of the primary pulley 30a detected by the second rotation speed sensor 52, and the rotation speed Nsec of the secondary pulley 30b detected by the third rotation speed sensor 53.

A speed ratio upon upshift Rp is a speed ratio of the CVT 30 in a case of upshifting at a current point in time. Describing using FIG. 2, for example, when the vehicle speed V is Va, the speed ratio at intersection C of the vehicle speed Va and the second predetermined rotation speed line L3 is equivalent to the speed ratio upon upshift Rp.

The driving force of the vehicle 100 is proportional to the vehicle speed change rate ΔV. Therefore, the vehicle speed change rate estimated value ΔVs is also a value proportional to the driving force upon upshift. Accordingly, in step S3, by judging whether or not the vehicle speed change rate estimated value ΔVs is equal to or more than the threshold V1, it is possible to judge whether or not the driving force upon upshift is less than the predetermined value (whether or not it is insufficient).

If the controller 10 judges that the first prohibition condition is satisfied, that is to say, judges that the driving force upon upshift will be insufficient, the process proceeds to step S4. On the other hand, if the controller 10 judges that the first prohibition condition is not satisfied, that is to say, judges that the driving force upon upshift will not be insufficient, the process proceeds to step S7.

In step S4, the stepwise shift is prohibited. The controller 10 does not perform the stepwise shift (does not transition to the upshift phase) even if the primary rotation speed Npri becomes the first predetermined rotation speed set per accelerator pedal opening APO, that is to say, maintains the shift suppression phase. More specifically, the controller 10 controls to maintain the speed ratio R at that point in time.

In step S5, judgment is made on whether or not an accelerator ON state is being continued. The controller 10 judges whether the accelerator pedal is being continuously stepped on from before prohibition of the stepwise shift to after prohibition of the stepwise shift. More specifically, the controller 10 judges whether or not the accelerator pedal is being stepped on continuously by equal to or more than a predetermined amount, for a predetermined time from before judging to prohibit the stepwise shift to after judging to prohibit the stepwise shift. If the accelerator ON state is continued, the process proceeds to step S6, and if the accelerator ON state is not continued, the process proceeds to END.

In step S6, the downshift control is performed. More specifically, the controller 10 controls a variator 30 to downshift in a stepped manner (the speed ratio R becomes on the lower side for a predetermined amount), and controls the engine 1 to make the engine rotation speed Ne (=primary rotation speed Npri) the maximum (MAX). By performing a downshift control together with such a downshift in the stepped manner, it is possible to accelerate the vehicle 100 at a short amount of time. This allows for, while performing stepwise shift, to address the acceleration request of the driver even in a situation in which the stepwise shift is prohibited. The downshift in the stepped manner in the embodiment is, for example, to perform shift instructions in a step form, or to make a shift instruction steep (change at a grade equal to or more than a predetermined grade).

Next described is a flow from step S7 on.

In step S7, the controller 10 judges whether or not the second prohibition condition is satisfied.

The second prohibition condition is a condition different from the first prohibition condition, and for example, is a case in which an occurrence of an abnormality to various elements is detected at a low oil temperature, a high oil temperature, or during the stepwise shift.

Describing more specifically, for example, at a time of the low oil temperature (oil temperature being equal to or less than a first predetermined oil temperature T1), the engine rotation speed Ne may not decrease and stay high even if the upshift is performed. In such a situation, the primary rotation speed Npri of the CVT 30 is unstable. Therefore, performing the downshift control may give a strange feel to the driver. Accordingly, at the time of the low oil temperature (the oil temperature being equal to or less than the first predetermined oil temperature T1), it is preferable to prohibit the stepwise shift and to prohibit the performing of the downshift control.

Moreover, at a time of the high oil temperature (the oil temperature being equal to or more than a second predetermined oil temperature T2), there are cases where the shift is limited; in such cases also, it is preferable to prohibit the stepwise shift and to prohibit the performing of the downshift control.

When an abnormality occurs to the various elements during the stepwise shift, there are cases where the shift is limited; in such cases also, it is preferable to prohibit the stepwise shift and to prohibit the performing of the downshift control.

If the controller 10 judges that the second prohibition condition is satisfied, the process proceeds to step S8. On the other hand, if the controller 10 judges that the second prohibition condition is not satisfied, the process proceeds to step S9.

In step S8, the performing of the stepwise shift is prohibited. The controller 10 does not perform the stepwise shift (does not transition to the upshift phase) even if the primary rotation speed Npri becomes the first predetermined rotation speed set per accelerator pedal opening APO, that is to say, maintains the shift suppression phase. More specifically, the controller 10 controls to maintain the speed ratio R at that point in time.

In step S9, the performing of the stepwise shift is permitted. The controller 10 performs the stepwise shift (transitions to the upshift phase) when the primary rotation speed Npri becomes the first predetermined rotation speed set per accelerator pedal opening APO.

As such, in the present embodiment, in the case in which insufficiency of the driving force upon upshift is assumed, the stepwise shift (upshift in a stepped manner) is prohibited. Furthermore, in a case in which the accelerator pedal is being stepped on continuously during a predetermined time before and after prohibiting the stepwise shift (upshift in a stepped manner), a downshift in a stepped manner is performed and the rotation speed of the engine 1 is increased. In a case in which the accelerator pedal is continuously being stepped on even after the stepwise shift has been prohibited, that would mean that the driver is continuously requesting to accelerate. Therefore, in such a case, the vehicle 100 can be accelerated by performing the downshift control. Accordingly, even in the situation in which the stepwise shift is prohibited, it is possible to address the acceleration request by the driver.

In a case in which the stepping on the accelerator pedal is relaxed, there is a high possibility that the driver has given up the acceleration; hence, the downshift control will not be performed.

Figure 5:
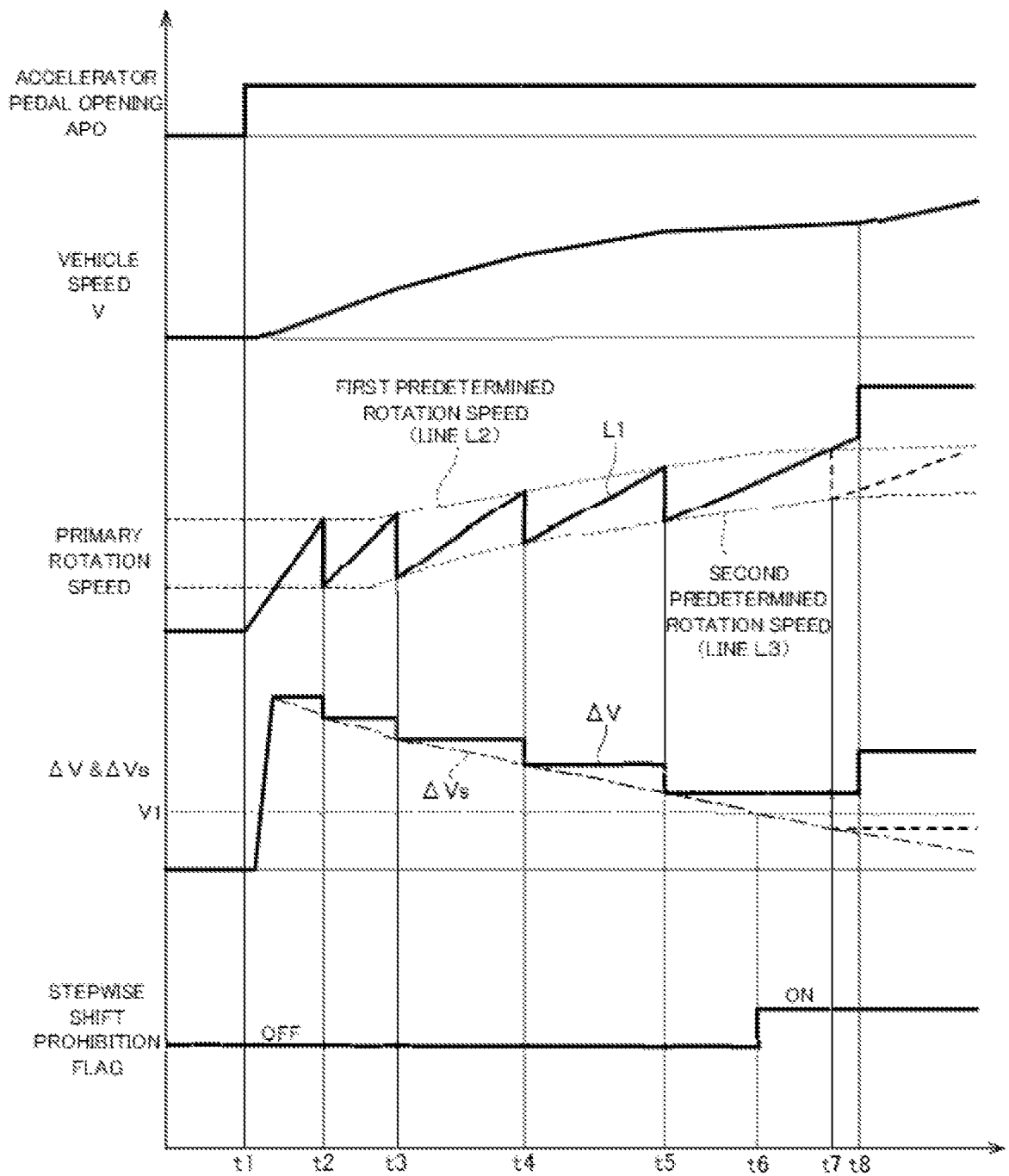
FIG. 5 is a timing chart of a shift control according to an embodiment of the present invention.

Next describes the stepwise shift control of the present embodiment, with reference to the timing chart illustrated in FIG. 5.

At time t1, once the accelerator pedal is stepped on, the vehicle 100 starts to accelerate. When the acceleration α is equal to or more than the predetermined value A, the controller 10 performs the stepwise shift control. More specifically, the controller 10 controls the speed ratio R and the primary rotation speed Npri (engine rotation speed) in line with the shift line set per accelerator pedal opening APO stored in advance. Moreover, the controller 10 calculates the vehicle speed change rate estimated value ΔVs, and judges whether or not the ΔVs is equal to or more than the threshold V1.

At time t2, when the primary rotation speed Npri becomes the first predetermined rotation speed, the phase transitions to the upshift phase and the stepwise shift is performed. More specifically, the controller 10 switches the speed ratio R to the high side in a stepped manner along the shift line L1 illustrated in FIG. 2. Thereafter, when the primary rotation speed Npri becomes the second predetermined rotation speed, the controller 10 transitions to the shift suppression phase, and increases the primary rotation speed Npri (engine rotation speed) while maintaining the speed ratio R. Hereon, up to time t5, the upshift phase and the shift suppression phase are performed repetitively.

At time t6, when ΔVs becomes less than the threshold V1, the controller 10 prohibits the performing of the stepwise shift. At this time, the controller 10 continues the shift suppression phase. More specifically, the controller 10 increases just the primary rotation speed Npri while maintaining the speed ratio R.

Then, at time t7, in a case in which the primary rotation speed Npri becomes the first predetermined rotation speed, the controller 10 does not perform the stepwise shift, and keeps on maintaining the speed ratio R. The bold dotted line in the primary rotation speed of FIG. 5 illustrates a case of performing the stepwise shift.

After elapse of a predetermined time from the time t6 (time t8), the controller 10 performs the downshift control. More specifically, the controller 10 controls the variator 30 so that the speed ratio R becomes on the low side for a predetermined amount, and controls the engine 1 so that the engine rotation speed Ne (=primary rotation speed Npri) becomes the maximum (MAX). The conditions to perform the downshift control is a case in which the accelerator pedal is continuously stepped on from before prohibiting the stepwise shift to after prohibiting the stepwise shift, at a predetermined opening degree or more.

As such, in the present embodiment, in the case in which insufficiency of the driving force upon upshift is assumed, the stepwise shift (upshift in the stepped manner) is prohibited. Furthermore, in a case in which the accelerator pedal is being stepped on continuously during a predetermined time before and after the stepwise shift (upshift in a stepped manner) is prohibited, the downshift control is performed. Accordingly, even in the situation in which the stepwise shift is prohibited, it is possible to address the acceleration request by the driver.

In the present embodiment, the case of causing the increase in the rotation speed of the engine 1 to MAX at the time of the downshift control is described as an example, however it is not limited to this. The rotation speed of the engine 1 may be set to be a threshold or more set in advance.

Configurations, actions, and effects of the embodiment of the present invention configured as the above are collectively described.

The controller 10 (control device) has a control unit that performs a stepwise shift by upshifting the continuously variable transmission (CVT 30) in a stepped manner to accelerate the vehicle 100, and the control unit (controller 10), in a case in which the accelerator pedal is continuously stepped on from before prohibiting the stepwise shift to after prohibiting the stepwise shift, performs the downshift control that downshifts the continuously variable transmission (CVT 30).

In this configuration, since the driving force is insufficient just by prohibiting the stepwise shift, the insufficient driving force can be compensated for by forcibly downshifting the continuously variable transmission (CVT 30). This allows for addressing the acceleration request by the driver even in a situation in which the stepwise shift is prohibited. Moreover, as a condition for performing the downshift control, a condition that the state in which the accelerator pedal is stepped on after (immediately after) prohibition of the stepwise shift is continued and maintained is employed. Hence, it is possible to provide an impression of applying driving force to a driver that intends to accelerate (driver that continues to step on the accelerator pedal), and not to provide a driving force having a strange feel to a driver that has given up the acceleration (driver who has lifted their foot from the accelerator pedal).

The controller 10 (control unit) does not perform the downshift control in a case in which the accelerator pedal opening becomes less than a predetermined value when the accelerator pedal is being continuously stepped on from before prohibition of the stepwise shift to after prohibition of the stepwise shift.

In the case in which the accelerator pedal opening becomes less than a predetermined amount, it can be deemed that the driver has given up on the acceleration. Therefore, in this case, it is possible to not provide a driving force having a strange feel by not performing the downshift control.

In the present embodiment, the downshift is a stepwise downshift.

By making this the stepwise downshift and not a gradual downshift, it is possible to provide an impression of a large driving force in a short amount of time.

The controller 10 (control unit) increases the input rotation speed (primary rotation speed Npri) of the continuously variable transmission (CVT 30) to equal to or more than the threshold when performing the downshift control.

By increasing the input rotation speed (primary rotation speed Npri) of the continuously variable transmission (CVT 30) to equal to or more than the threshold when performing the downshift control, it is possible to achieve a greater driving force.

The controller 10 (control unit) includes, as the prohibition condition of the stepwise shift, the first prohibition condition on the basis of an insufficient driving force judgment and a second prohibition condition different from the first prohibition condition (oil temperature abnormality, occurrence of breakage etc.), and in a case of prohibiting the stepwise shift by the first prohibition condition the downshift control is performed, and in a case of prohibiting the stepwise shift by the second prohibition condition the downshift control is not performed.

When a unit state of the automatic transmission 3 is in a normal state, the downshift control is performed in a case in which the performing of the stepwise shift is prohibited. This can improve the acceleration feel. Moreover, in a state in which the unit state of the automatic transmission 3 is unstable, the performing of the downshift control is prohibited in a case in which the performing of the stepwise shift is prohibited. This can prevent the behavior of the vehicle 100 from becoming unstable.

The above describes an embodiment of the present invention, however the above embodiment merely illustrates one portion of an application example of the present invention, and does not intend to limit the technical range of the present invention to the specific configurations in the above embodiment.

Moreover, in the embodiment described above, in step S3, whether or not the driving force will be insufficient upon upshift was predicted by using the vehicle speed change rate estimated value $\Delta Vs$ as the first prohibition condition. However, the first prohibition condition is not limited to this, and for example may use a driving force upon upshift that is estimated immediately before the upshift. Moreover, a condition that an estimated traveling resistance upon the upshift of the vehicle 100 is equal to or more than a predetermined value may serve as the first prohibition condition. In this case, the traveling resistance may be calculated by suitably selecting one or more of various parameters such as air resistance, grade resistance, rolling resistance, and acceleration resistance, and summing these parameters. Moreover, the insufficient driving force may be estimated by using one or more of parameters selected from air density (air pressure), road grade, vehicle speed, vehicle weight and vehicle acceleration. For example, the driving force is estimated when a sudden increase in road grade is detected. Moreover, the insufficient driving force may be estimated by estimating that the road grade will become greater by obtaining map information. Of course, the insufficient driving force may be estimated by different methods.

This application claims priority based on Japanese Patent Application No. 2018-234833 filed with the Japan Patent Office on Dec. 14, 2018, the entire contents of which are incorporated into this specification.

The invention claimed is:

1. A vehicle control device configured to control a vehicle having a continuously variable transmission, the control device comprising:
   a control unit configured to perform stepwise shift that upshifts the continuously variable transmission in a stepped manner to accelerate the vehicle, wherein
   the control unit includes, as prohibition conditions of the stepwise shift, a first prohibition condition on the basis of an insufficient driving force judgment, and
   the control unit performs a downshift control configured to downshift the continuously variable transmission in a case in which an accelerator pedal is continuously stepped on from before prohibition of the stepwise shift to after the prohibition by the first prohibition condition of the stepwise shift.

2. The vehicle control device according to claim 1, wherein
   the control unit does not perform the downshift control in a case in which an accelerator pedal amount becomes less than a predetermined value while the accelerator pedal is continuously stepped on from before the prohibition of the stepwise shift to after the prohibition of the stepwise shift.

3. The vehicle control device according to claim 2, wherein
   the downshift is a stepwise downshift.

4. The vehicle control device according to claim 1, wherein
   the control unit increases an input rotation speed of the continuously variable transmission to equal to or more than a threshold when performing the downshift control.

5. The vehicle control device according to claim 1, wherein
   the control unit includes a second prohibition condition different from the first prohibition condition,
   the downshift control is performed in a case in which the stepwise shift is prohibited by the first prohibition condition, and the downshift control is not performed in a case in which the stepwise shift is prohibited by the second prohibition condition.

6. A vehicle control device configured to control a vehicle having a continuously variable transmission, the control device comprising:
a control unit configured to perform stepwise shift that upshifts the continuously variable transmission in a stepped manner to accelerate the vehicle, wherein
the control unit performs a downshift control configured to downshift the continuously variable transmission in a case in which an accelerator pedal is continuously stepped on from before prohibition of the stepwise shift to after the prohibition of the stepwise shift, and
the control unit does not perform the downshift control in a case in which an accelerator pedal amount becomes less than a predetermined value while the accelerator pedal is continuously stepped on from before the prohibition of the stepwise shift to after the prohibition of the stepwise shift.

7. A vehicle control device configured to control a vehicle having a continuously variable transmission, the control device comprising:
a control unit configured to perform stepwise shift that upshifts the continuously variable transmission in a stepped manner to accelerate the vehicle, wherein
the control unit performs a downshift control configured to downshift the continuously variable transmission in a case in which an accelerator pedal is continuously stepped on from before prohibition of the stepwise shift to after the prohibition of the stepwise shift,
the control unit includes, as prohibition conditions of the stepwise shift, a first prohibition condition on the basis of an insufficient driving force judgment, and a second prohibition condition different from the first prohibition condition,
the downshift control is performed in a case in which the stepwise shift is prohibited by the first prohibition condition, and
the downshift control is not performed in a case in which the stepwise shift is prohibited by the second prohibition condition.

* * * * *